(12) United States Patent
Torres et al.

(10) Patent No.: US 6,980,588 B2
(45) Date of Patent: Dec. 27, 2005

(54) APPARATUS FOR HANDLING HIGH SPEED DATA COMMUNICATION SIGNALS AND METHOD FOR MANUFACTURE THEREOF

(75) Inventors: Hector Torres, Dallas, TX (US); Steven Tinsley, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 748 days.

(21) Appl. No.: 10/061,771

(22) Filed: Jan. 31, 2002

(65) Prior Publication Data

US 2003/0142736 A1 Jul. 31, 2003

(51) Int. Cl.[7] .................................. H04B 3/36
(52) U.S. Cl. .................. 375/211; 375/219; 375/220; 326/86; 327/111
(58) Field of Search ............. 375/211, 257, 52, 375/371, 219, 220; 326/68, 84, 83, 82, 86; 327/65, 108, 111

(56) References Cited

U.S. PATENT DOCUMENTS 6,064,226 A * 5/2000 Earl ........................ 326/68
6,281,715 B1 * 8/2001 DeClue et al. ............... 327/65
6,369,621 B1 * 4/2002 Tinsley et al. ............. 327/108
6,847,232 B2 * 1/2005 Tinsley et al. ............... 326/84

* cited by examiner

Primary Examiner—Stephen Chin
Assistant Examiner—Ted M. Wang
(74) Attorney, Agent, or Firm—W. Daniel Swayze, Jr.; W. James Brady; Frederick J. Telecky, Jr.

(57) ABSTRACT

An apparatus for handling high speed data communication signals in at least one input channel. Each communication signal is encoded in signal excursions in at least one predetermined format. The apparatus includes: (a) at least one input locus coupled with each input channel for receiving the signals; (b) at least one output locus for presenting selected communication signals in a desired format in at least one output channel; and (c) a plurality of treating circuits for treating the signal excursions in a plurality of formats that include the predetermined format and the desired format. Each treating circuit is coupled with at least one respective input locus and at least one respective output locus. The apparatus presents sufficiently low capacitance between input loci and output loci to impart substantially zero time delay to the communication signals.

20 Claims, 6 Drawing Sheets

APPARATUS FOR HANDLING HIGH SPEED DATA COMMUNICATION SIGNALS AND METHOD FOR MANUFACTURE THEREOF

BACKGROUND OF THE INVENTION

The present invention is related to data communication signal handling apparatuses. In particular, the preferred embodiment of the present invention is manifested in a non-delaying input circuit arrangement for a high speed data communication signal repeater apparatus. The input circuit is configured to receive information-conveying communication signals encoded according to at least one predetermined signal format, and to repeat the encoded information in an output signal encoded according to a desired format at an output locus. Preferably the desired format is one of the at least one predetermined formats. The apparatus is configured to present sufficiently low resistance-capacitance combination between its input loci and its output loci to impart substantially zero time delay to communication signals that are handled.

In today's data transmission systems there are several high speed, low voltage transmission standards, or formats, that may be employed for conveying signals. Standards are agreed upon protocols or formats that are established to provide uniformity in dealing with common situations. In the case of data communications, for example, establishing standards for handling data signals assures that equipment built by various manufacturers will be capable of implementing the agreed upon standard and assures that the various equipment will work compatibly with each other.

Market forces urge manufacturers toward producing smaller, less complex apparatuses so that products using those apparatuses may be more compact and more reliable. Further, if an apparatus can handle more than one standard, for example, with little or no additional change or rework required, there is a beneficial reduced complexity of stocking and resupply of spare or replacement parts for products that use such a multicapable apparatus.

Data transmission systems require repeater apparatuses at intervals within their distribution networks. Repeaters receive data signals, assure their integrity in terms of timing, periodicity, amplitude and other parameters, and then forward the "reworked" signal onward within the network to a destination or to another repeater. Currently many data transmission systems are beginning to move away from the older Emitter Controlled Logic (ECL) and Positive Emitter Controlled Logic (PECL) standards or formats toward wider employment of more rigorous standards, such as Low Voltage Differential Signaling (LVDS) and Low Voltage Positive Emitter Controlled Logic (LVPECL). In many data transmission systems there is a need for a repeater that is capable of handling high speed differential signaling configured and transmitted according to either the LVDS format or the LVPECL format.

It is desirable that the common mode range of a differential signal be as wide a signal range as possible in order to allow for longer data transmission lengths and greater ground offsets between a driver and a receiver. Such a design provides increased reliability and signal integrity. Generally, a rail to rail input common mode level is desired. Further additional requirements include low input leakage to conform to data transmission standards such as LVDS, and high sensitivity to small differential input signals while operating at high speeds.

Prior art data signaling repeaters are available that meet one or some of such design needs, but no prior art designs fulfill all of these design needs.

There is a need for an apparatus for handling high speed data communication signals that has a rail to rail common mode input range, high input sensitivity, low input leakage and high speed operation. The present invention provides such a data signal handling apparatus that fulfills the above needs principally by establishing a simple construction that presents sufficiently low resistance-capacitance combination to impart substantially zero time delay to the communication signals being handled.

SUMMARY OF THE INVENTION

An apparatus for handling high speed data communication signals in at least one input channel. Each communication signal is encoded in signal excursions in at least one predetermined format. The apparatus includes: (a) at least one input locus coupled with each input channel for receiving the signals; (b) at least one output locus for presenting selected communication signals in a desired format in at least one output channel; and (c) a plurality of treating circuits for treating the signal excursions in a plurality of formats that include the predetermined format and the desired format. Each treating circuit is coupled with at least one respective input locus and at least one respective output locus. The apparatus presents sufficiently low resistance-capacitance between input loci and output loci to impart substantially zero time delay to the communication signals.

It is therefore an object of the present invention to provide an apparatus for handling high speed data communication signals that has a rail to rail common mode input range, high input sensitivity, low input leakage and high speed operation.

It is a further object of the present invention to provide an apparatus for handling high speed data communication signals that presents sufficiently low capacitance to impart substantially zero time delay to the communication signals being handled.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
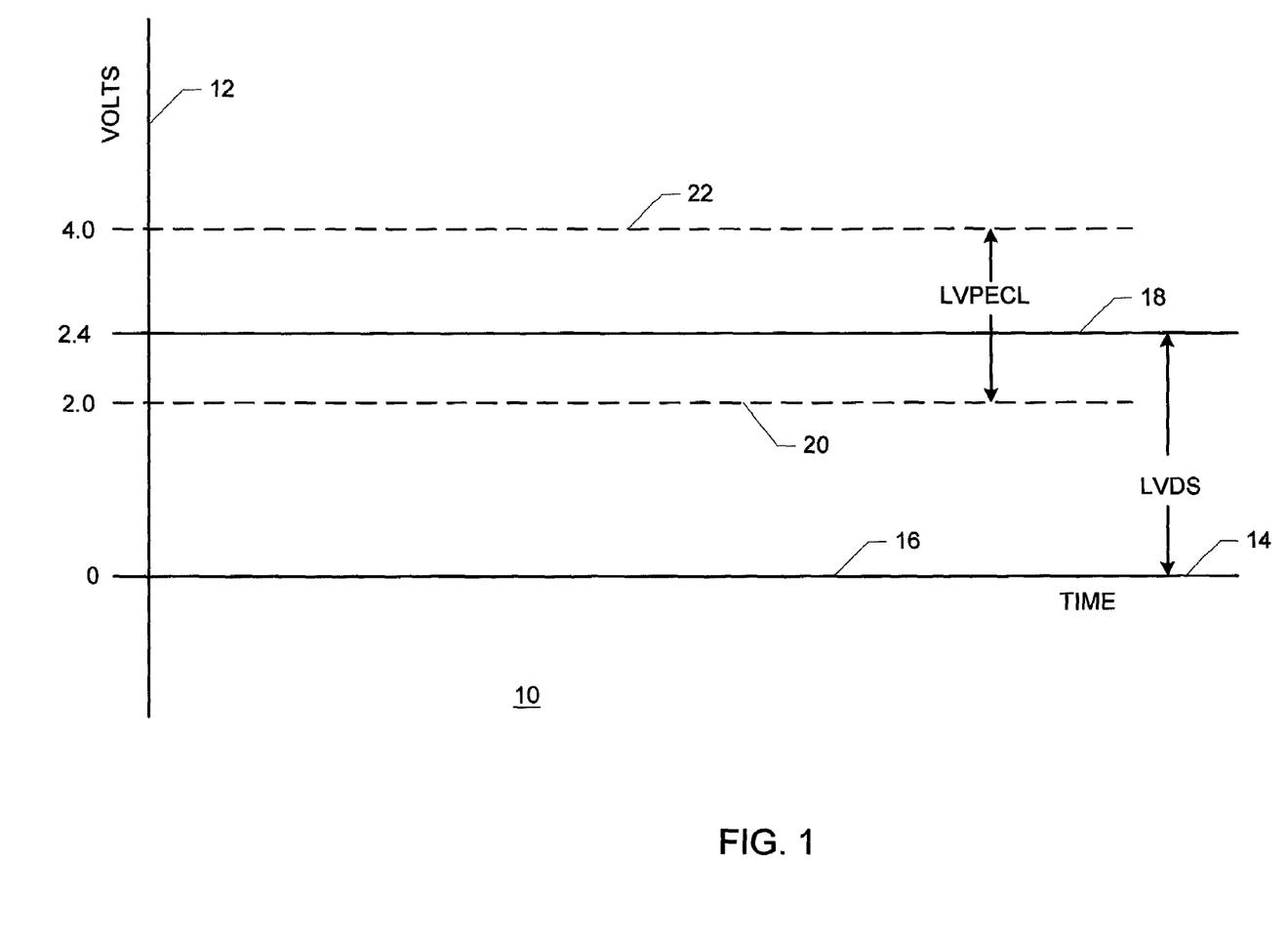
FIG. 1 is a schematic graphic representation illustrating overlapping signaling formats.

FIG. 1 is a schematic graphic representation illustrating overlapping signaling formats. In FIG. 1, a graphic plot 10 indicates input common mode voltage in volts on an axis 12 as a function of time on an axis 14. A first standard (or format, or protocol) is encoded by variances from an input common mode voltage that ranges from a minimum value 16 substantially at ground (zero volts) to a maximum value 18 substantially at 2.4 volts. These minimum-maximum values are representative of the LVDS (Low Voltage Differential Signaling) standard. A second standard (or format, or protocol) is encoded by variances from an input common mode voltage that ranges from a minimum value 20 substantially at 2.0 volts to a maximum value 22 substantially at 4.0 volts. These minimum-maximum values are representative of the LVPECL (Low Voltage Positive Emitter Controlled Logic) standard. Thus, the two signaling formats illustrated in FIG. 1 overlap in their operating ranges with maximum operating value 18 for one format (LVDS) being higher than the minimum 20 operating value for the other format (LVPECL). An apparatus that can accept input common mode voltages in a range including minimum value 14 and maximum value 22 is said to have a rail to rail common mode input range for the formats involved. In this simple example the rail to rail capability relates to operations involving signals transmitted according to LVDS and LVPECL formats.

The conventional prior art approach to providing an apparatus that can accommodate rail to rail inputs for two formats in a situation such as illustrated in FIG. 1 is to use complementary devices and control circuitry to regulate the current flowing into each differential pair in order to give a generally constant gain over the common mode range. The problem with such a design approach is that rail to rail range is achieved at the expense of a significant variation of quiescent current across the common mode range when a MOS (Metal Oxide Semiconductor) input device is employed. Such variation of quiescent current adds power and complexity to a circuit, especially when very high impedance is required for low leakage currents.

Figure 2:
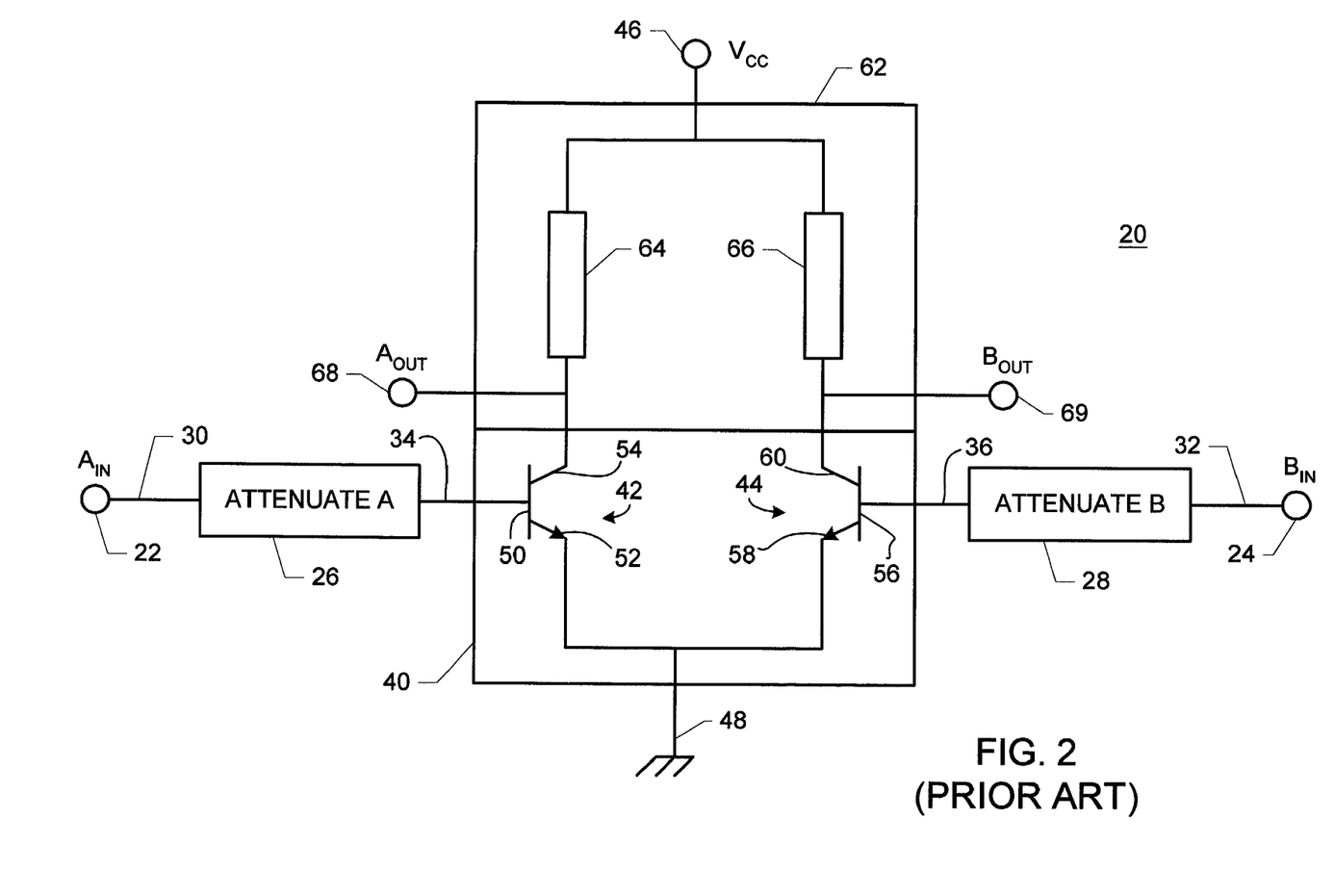
FIG. 2 is a schematic block diagram of a prior art apparatus for communication signal repeating operations that accommodates a single input signal format.

FIG. 2 is a schematic block diagram of a prior art apparatus for communication signal repeating operations that accommodates a single input signal format. In FIG. 2, a repeater apparatus 20 receives differential signals $A_{IN}$, $B_{IN}$ at input loci 22, 24. Attenuating circuits 26, 28 receive differential signals $A_{IN}$, $B_{IN}$ from input loci 22, 24 via lines 30, 32. Attenuating circuits 26, 28 are configured to provide signals via lines 34, 36 to a timing circuit 40. That is, timing circuit 40 requires that certain operating parameters be satisfied in order that timing circuit 40 may operate properly. Such operating parameters are principally voltage ranges, and may include other signal attributes consistent with a predetermined signal format (or protocol, or standard). Thus, signals provided to timing circuit 40 via lines 34, 36 are substantially true representations of differential signals $A_{IN}$, $B_{IN}$ in so far as timing aspects of variations of those signals are concerned. The amplitudes of the variations of signals provided to timing circuit 40 via lines 34, 36 are not necessarily compliant with whatever format is employed in the system (e.g., LVDS or LPECL; not shown in FIG. 2) in which repeater apparatus 20 is employed. Instead, signals provided to timing circuit 40 are configured for acceptance and treatment by timing circuit 40.

Timing circuit 40 includes a substantially identical pair of transistors 42, 44 coupled between a common voltage source 46 and a common ground 48. Transistor 42 is preferably an NPN bipolar junction transistor having a base 50, an emitter 52 and a collector 55. Transistor 44 is preferably an NPN bipolar junction transistor having a base 56, an emitter 58 and a collector 60. Line 34 is coupled with base 50 of transistor 42; line 36 is coupled with base 56 of transistor 44. In such a configuration signals lines 34, 36 effect gating of transistors 42, 44 to gatingly control completion of an electrical circuit between common voltage source 46 and common ground 48 through transistors 42, 44. Preferably, differential signals $A_{IN}$, $B_{IN}$ vary substantially simultaneously so that transistors 42, 44 operate substantially together in exercising gating control for connecting common voltage source 46 with common ground 48.

A level setting circuit 62 treats signals passing between common voltage source 46 and common ground 48 through transistors 42, 44. Level setting circuit 62 includes an impedance 64 coupled in series between common voltage source 46 and transistor 42, and an impedance 66 coupled in series between common voltage source 46 and transistor 44. Values for impedances 64, 66 are substantially equal and are preferably selected to present output signals $A_{OUT}$, $B_{OUT}$ at output loci 68, 69 appropriately configured to conform to the format employed in the system (e.g., LVDS or LVPECL; not shown in FIG. 2) in which repeater apparatus 20 is employed. In such manner output signals $A_{OUT}$, $B_{OUT}$ are properly timed and properly otherwise formatted in terms of amplitudes and other signal characteristics to faithfully represent differential signals $A_{IN}$, $B_{IN}$.

Figure 3:
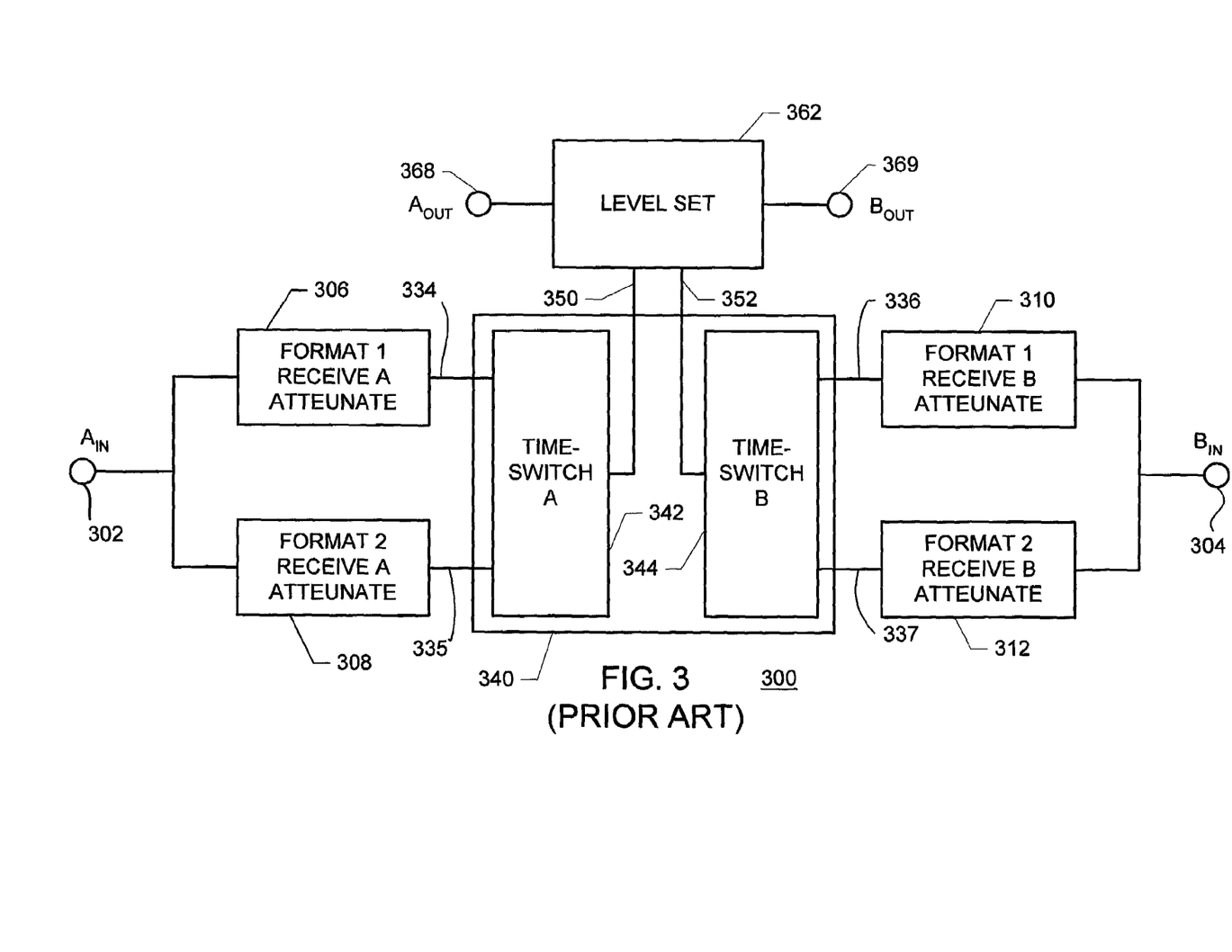
FIG. 3 is a schematic block diagram of a prior art apparatus for communication signal repeating operations that accommodates two input signal formats.

FIG. 3 is a schematic block diagram of a prior art apparatus for communication signal repeating operations that accommodates two input signal formats. In FIG. 3, a repeater apparatus 300 receives differential signals $A_{IN}$, $B_{IN}$ at input loci 302, 304. Attenuating circuits 306, 308 receive differential signal $A_{IN}$ from input locus 302. Attenuating circuits 310, 312 receive differential signal $B_{IN}$ from input locus 304. Attenuating circuits 306, 310 are configured for accommodating and attenuating signals in a first format (or standard, or protocol) for providing signals via lines 334, 336 to a timing circuit 340. Attenuating circuits 308, 312 are configured for accommodating and attenuating signals in a second format (or standard, or protocol) for providing signals via lines 335, 337 to timing circuit 340. Timing circuit 340 requires that certain operating parameters be satisfied in order that timing circuit 340 may operate properly. Such certain operating parameters are principally voltage ranges, and may include other signal attributes consistent with a predetermined signal format (or protocol or standard). Thus, signals provided to timing circuit 340 via lines 334, 335, 336, 337 are substantially true representations of differential signals $A_{IN}$, $B_{IN}$ in so far as timing aspects of variations of those signals are concerned. The amplitudes of the variations of signals provided to timing circuit 340 via lines 334, 335, 336, 337 are not necessarily compliant with whatever format is employed in the system (e.g., LVDS or LPECL; not shown in FIG. 3) in which repeater apparatus 300 is employed. Instead, signals provided to timing circuit 340 are configured for acceptance and treatment by timing circuit 340.

By providing a common input locus 302 for providing input signal $A_{IN}$ to attenuating circuits 306, 308 repeater apparatus 300 ensures that a properly representative and configured signal is provided to timing circuit 340 whether input signal $A_{IN}$ is transmitted in a first format (handled by attenuating circuit 306 and delivered to timing circuit 340 via line 334) or in a second format (handled by attenuating circuit 308 and delivered to timing circuit 340 via line 335).

Similarly, by providing a common input locus 304 for providing input signal $B_{IN}$ to attenuating circuits 310, 312 repeater apparatus 300 ensures that a properly representative and configured signal is provided to timing circuit 340 whether input signal $B_{IN}$ is transmitted in a first format (handled by attenuating circuit 310 and delivered to timing circuit 340 via line 336) or in a second format (handled by attenuating circuit 312 and delivered to timing circuit 340 via line 337).

Timing circuit 340 includes a substantially identical pair of time-switch circuits 342, 344 for effecting timed switching of signals. Time-switch circuits 342, 344 are coupled between attenuating circuits 306, 308, 310, 312 and a level setting circuit 362 via lines 350, 352. Timing circuit 340 and level setting circuit 362 may be configured and operate substantially as described in connection with timing circuit 40 and level setting circuit 62 (FIG. 2).

Level setting circuit 362 treats signals from timing circuit 340 to present output signals $A_{OUT}$, $B_{OUT}$ at output loci 368, 369 appropriately configured to conform to the format employed in the system (e.g., LVDS or LPECL; not shown in FIG. 3) in which repeater apparatus 300 is employed. In such manner output signals $A_{OUT}$, $B_{OUT}$ are properly timed and properly otherwise formatted in terms of amplitudes and other signal characteristics to faithfully represent differential signals $A_{IN}$, $B_{IN}$, regardless of whether input signals $A_{IN}$, $B_{IN}$ are transmitted in a first format or a second format.

FIG. 3 illustrates the conventional prior art approach to providing a data communication repeater apparatus capable of handling multiple formats in a system. As mentioned earlier, the desire for providing a multiple format handling capability is driven substantially by market forces leaning toward producing smaller, less complex apparatuses so that products using those apparatuses may be more compact and more reliable. Further, if an apparatus can handle more than one standard, for example, with little or no additional change or rework required, there is a reduced complexity of stocking and resupply of spare or replacement parts for products that use such a multicapable apparatus.

The conventional approach to implementing rail to trail common mode input range in a repeater apparatus (as exemplified in repeater apparatus 300; FIG. 3) is to use complementary devices (e.g., transistors 42, 44. FIG. 2) and controlled circuitry (e.g., attenuating circuits 306, 308, 310, 312; FIG. 3) to regulate current flowing into each differential pair in order to give a substantially consistent performance over the desired common mode range. However, while such a configuration succeeds in providing a rail to rail input range, it has a significant variation of quiescent current across the common mode range when MOS (Metal Oxide Semiconductor) input devices are used. Some of the signal standards, or formats (e.g., LVDS—Low Voltage Differential Signaling), employ signal ranges that are better handled by MOS devices than by complementary devices (such as NPN transistors). Other signal standards (e.g., LVPECL—Low Voltage Positive Emitter Controlled Logic) are better handled by complementary devices than by MOS devices. Variations in quiescent current add another limitation in terms of power and complexity of attenuation circuits 306, 308, 310, 312 when very high input impedance is required for low leakage currents.

Many prior art implementations of repeater circuitry are single ended implementations using unbalanced signal paths. Repeater apparatus 300 (FIG. 3) is an example of such a device in that signal paths 334, 335 are not balanced signal paths; and signal paths 336, 337 are not balanced signal paths. Such prior art repeater designs are not suited for high speed LVDS/LVPECL applications because LVDS/LVPECL require low pulse skew and low jitter in signal handling performance. In high speed LVDS/LVPECL repeater designs, symmetry of signaling is especially important. Constant gain across the operating range is less important than the need for symmetry. What is generally desired for a repeater apparatus, especially a repeater apparatus for use in LVDS/LVPECL signaling operations, is a certain amount of gain that allows the outputs from the repeater apparatus to be appropriately switched to conform with the required signaling protocols.

Too much capacitance or too much resistance in attenuator circuitry introduces RC time constant effects that can introduce significant time delays in signal handling and forwarding. Such delays are inconsistent with achieving high speeds and balanced signal paths in data communication signal handling. Prior art attenuator circuits (e.g. attenuator circuits 306, 308, 310, 312; FIG. 3) used for configuring signals of various formats for input compatibility with timing circuitry (e.g., timing circuit 340; FIG. 3) commonly introduced resistance, or capacitance, or both resistance and capacitance in effecting the required signal conversions appropriate to achieve necessary compatibility. Such high resistance, high capacitance designs for use in repeater apparatuses to accommodate multiple signaling standards at a common input may work acceptably for some systems. However, such design approaches are not suitable for high speed signaling operations. While such attenuating circuits may succeed in establishing an appropriate common mode input range for the repeater to accommodate the desired multiple signaling protocols, or formats, the differential component of the signaling is often degraded, thereby reducing the input sensitivity of the apparatus. Further, if low input leakages are required, the resistances employed in an attenuator circuit can become quite large. Such large resistances typically require large die area in a circuit, which is a detriment to compact circuitry.

Thus, there is a clear indication of need for an extended common mode input receiver circuit with very high impedance and high differential sensitivity that is suitable for high speed repeater applications, especially for high speed LVDS/LVPECL repeater applications.

Figure 4:
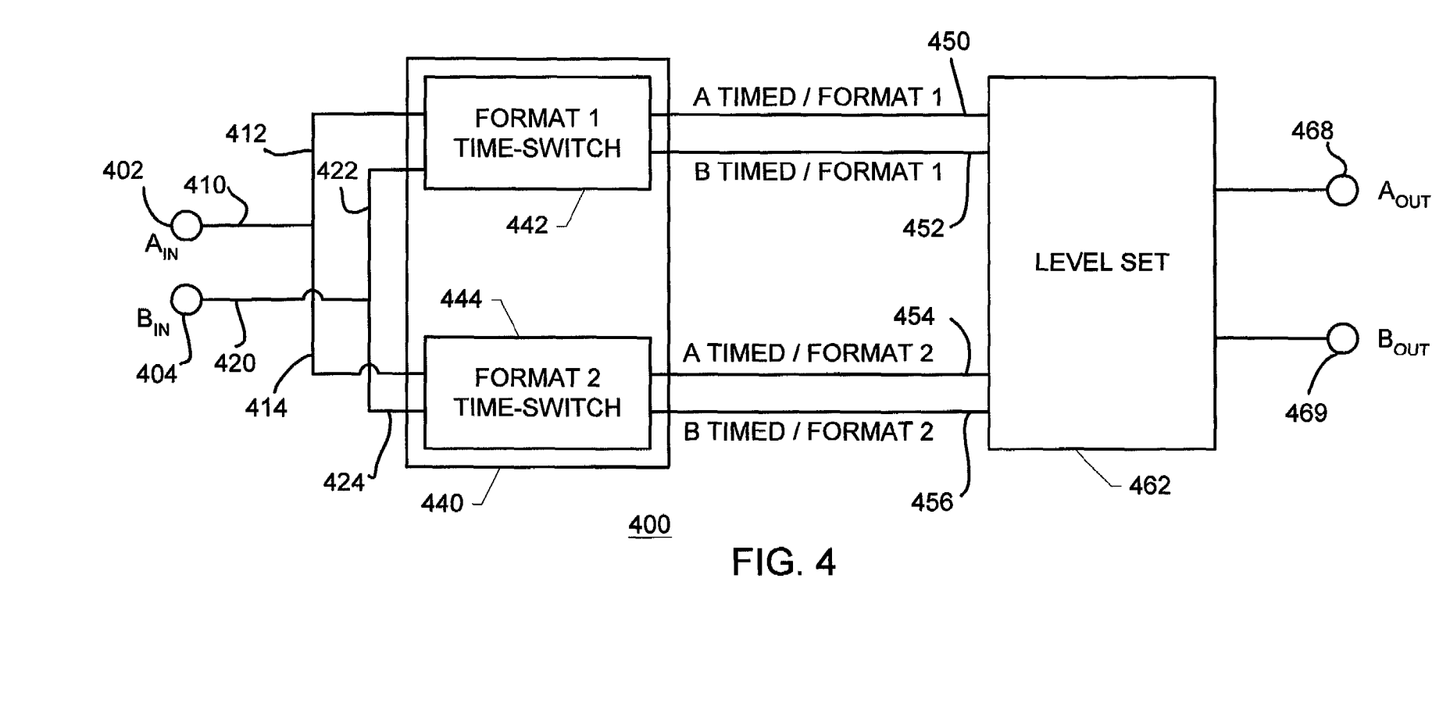
FIG. 4 is a schematic block diagram of an apparatus for communication signal repeating operations that accommodates two input signal formats that is constructed according to the teachings of the present invention.

FIG. 4 is a schematic block diagram of an apparatus for communication signal repeating operations that accommodates two input signal formats that is constructed according to the teachings of the present invention. In FIG. 4, a repeater apparatus 400 receives differential signals $A_{IN}$, $B_{IN}$ at input loci 402, 404. Input loci 402, 404 are coupled with a timing circuit 440 with no intervening signal adjusting or attenuating circuitry. Timing circuit 440 includes a pair of parallel coupled time-switch units 442, 444. Time-switch unit 442 is configured to accommodate and handle signals conveyed in a first format (or standard, or protocol). Time-switch unit 444 is configured to accommodate and handle signals conveyed in a second format (or standard, or protocol). Thus, for example, time-switch unit 442 may be configured for handling signals conveyed according to the LVDS standard or format, and time-switch unit 444 may be configured for handling signals conveyed according to the LVPECL standard or format. Line 410 from input locus 402 is coupled with lines 412, 414 to deliver differential signal $A_{IN}$ to timing circuit 440. Line 412 delivers differential signal $A_{IN}$ to time-switch unit 442; line 414 delivers differential signal $A_{IN}$ to time-switch unit 444. Line 420 from input locus 404 is coupled with lines 422, 424 to deliver differential signal $B_{IN}$ to timing circuit 440. Line 422 delivers differential signal $B_{IN}$ to time-switch unit 442; line 424 delivers differential signal $B_{IN}$ to time-switch unit 444.

By providing common input locus 402 for delivering input signal $A_{IN}$ to timing circuit 440 repeater apparatus 400 ensures that a properly representative and configured signal is provided to timing circuit 440 whether input signal $A_{IN}$ is transmitted in a first format or in a second format. Similarly, by providing a common input locus 404 for delivering input signal $B_{IN}$ to timing circuit 440 repeater apparatus 400 ensures that a properly representative and configured signal is provided to timing circuit 440 whether input signal $B_{IN}$ is transmitted in a first format or in a second format.

In such an arrangement, differential signals $A_{IN}$, $B_{IN}$ arrive substantially simultaneously at time-switch units 442, 444. Time-switch units 442, 444 are configured to substantially simultaneously operate upon differential signals $A_{IN}$, $B_{IN}$ to generate timed output signals on output lines 450, 452, 454, 456 as appropriate. Thus output line 450 conveys a timed output signal representative of differential input signal $A_{IN}$ as input signal $A_{IN}$ may be expressed in format one. Output line 452 conveys a timed output signal representative of differential input signal $B_{IN}$ as input signal $B_{IN}$ may be expressed in format one. Output line 454 conveys a timed output signal representative of differential input signal $A_{IN}$ as input signal $A_{IN}$ may be expressed in format two. Output line 456 conveys a timed output signal representative of differential input signal $B_{IN}$ as input signal $B_{IN}$ may be expressed in format two.

Timed output signals on output lines $A_{IN}$, $B_{IN}$ faithfully recreating timing present in differential signals $A_{IN}$, $B_{IN}$ and are substantially true representations of differential signals $A_{IN}$, $B_{IN}$ in so far as timing aspects of variations of those signals are concerned. The amplitudes of the variations of timed output signals on output lines 450, 452, 454, 456 are not necessarily compliant with whatever format is employed in the system (e.g., LVDS or LPECL; not shown in FIG. 4) in which repeater apparatus 400 is employed. Instead, timed output signals on output lines 450, 452, 454, 456 are provided to a level setting circuit 462 configured for acceptance and treatment by level setting circuit 462.

Level setting circuit 462 receives timed output signals from output lines 450, 452, 454, 456 as appropriate and treats those timed output signals to present output signals $A_{OUT}$, $B_{OUT}$ at output loci 468, 469 appropriately configured to conform to the format employed in the system or network (e.g., LVDS or LVPECL; not shown in FIG. 4) in which repeater apparatus 400 is employed. In such manner output signals $A_{OUT}$, $B_{OUT}$ are properly timed and properly otherwise formatted in terms of amplitudes and other signal characteristics to faithfully represent input differential signals $A_{IN}$, $B_{IN}$, regardless of whether input signals $A_{IN}$, $B_{IN}$ are transmitted in a first format or a second format. Level setting circuit 462 may be configured to present output signals $A_{OUT}$, $B_{OUT}$ configured to conform with format one or format two. That is, in operation, differential signals $A_{IN}$, $B_{IN}$ will likely be conveyed in either format one or format two. It is not likely that the signals will be conveyed in both formats simultaneously. Repeater apparatus 400 is configured to accept signals in either format one or format two as a way to make one part do "double duty" to reduce part count and inventory requirements.

In an exemplary practical implementation of the present invention, a user seeking to place a repeater in a data communication network may select a model of repeater apparatus 400 for which one of time-switch units 442, 444 can handle the format of signals then extant in the user's network. For example, a user may have a network that operates using signals formatted for LVDS standards. In such a situation, the user will ensure that level setting circuit 462 sets appropriate levels for output signals to be compatible with downstream units (other repeaters, receivers, or other equipment) that are configured for dealing with signals conveyed according to the LVDS standard. If the user should later wish to change the network to operate using signals configured according to another standard, say the LVPECL standard for example, then the user needs only to change level setting circuit 462 to another such unit constructed to present LVPECL configured signals at output loci 468, 469. Input may still be made to the same timing circuit 440 with no changes because of the capability of timing circuit 440 to handle both signal formats.

A significant advantage with the novel design of the present invention is that time-switch units 442, 444 are constructed to accommodate the incoming differential signals $A_{IN}$, $B_{IN}$ rather than requiring a user to condition the incoming differential signals $A_{IN}$, $B_{IN}$ to conform to the operational needs of an input circuit. By altering the incoming signals as little as possible, one introduces fewer alterations and fewer delays to signals as they are relayed or repeated for further transfer through a network. Such minimal treatment of signals facilitates accurate high speed operation.

Figure 5:
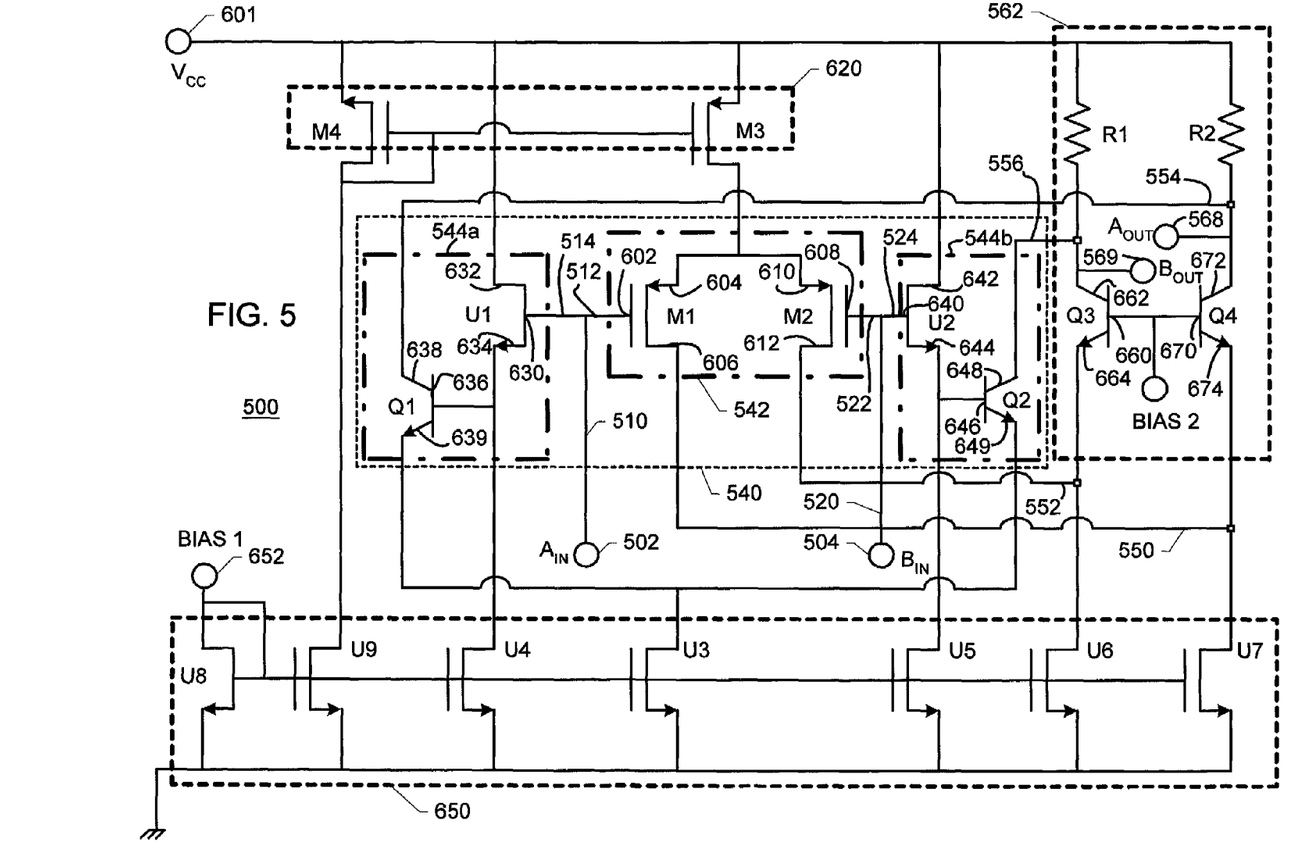
FIG. 5 is an electrical schematic diagram illustrating the preferred embodiment of the apparatus of the present invention.

FIG. 5 is an electrical schematic diagram illustrating the preferred embodiment of the apparatus of the present invention. In FIG. 5, a repeater apparatus 500 receives differential signals $A_{IN}$, $B_{IN}$ at input loci 502, 504. Input loci 502, 504 are coupled with a timing circuit 540 with no intervening signal adjusting or attenuating circuitry. Timing circuit 540 includes a pair of parallel coupled substantially time-switch units 542, 544. Time-switch unit 542 is configured to accommodate and handle signals conveyed in a first format, LVDS (Low Voltage Differential Signaling). Time-switch unit 544 is configured to accommodate and handle signals conveyed in a second format, LVPECL (Low Voltage Positive Emitter Coupled Logic). Time-switch 544 is manifested in FIG. 5 in two portions 544a, 544b. Line 510 from input locus 502 is coupled with lines 512, 514 to deliver differential signal $A_{IN}$ to timing circuit 440. Line 512 delivers differential signal $A_{IN}$ to time-switch unit 542; line 514 delivers differential signal $A_{IN}$ to time-switch unit portion 544a. Line 520 from input locus 504 is coupled with lines 522, 524 to deliver differential signal BIN to timing circuit 540. Line 522 delivers differential signal $B_{IN}$ to time-switch unit 542; line 524 delivers differential signal $B_{IN}$ to time-switch unit portion 544b.

By providing common input locus 502 for delivering input signal $A_{IN}$ to timing circuit 540 repeater apparatus 500 ensures that a properly representative and configured signal is provided to timing circuit 540 whether input signal $A_{IN}$ is transmitted in LVDS format or in LVPECL format. Similarly, by providing a common input locus 504 for delivering input signal $B_{IN}$ to timing circuit 540 repeater apparatus 500 ensures that a properly representative and configured signal is provided to timing circuit 540 whether input signal BIN is transmitted in LVDS format or in LVPECL format.

In such an arrangement, differential signals $A_{IN}$, $B_{IN}$ arrive substantially simultaneously at time-switch units 542, 544. Time-switch units 542, 544 are configured to substantially simultaneously operate upon differential signals $A_{IN}$, $B_{IN}$ to generate timed output signals on output lines 550, 552, 554, 556 as appropriate. Thus output line 550 conveys a timed output signal representative of differential input signal $A_{IN}$ as input signal $A_{IN}$ may be expressed in LVDS format.

Output line 552 conveys a timed output signal representative of differential input signal $B_{IN}$ as input signal $B_{IN}$ may be expressed in LVDS format. Output line 554 conveys a timed output signal representative of differential input signal $A_{IN}$ as input signal $A_{IN}$ may be expressed in LVPECL format. Output line 556 conveys a timed output signal representative of differential input signal $B_{IN}$ as input signal $B_{IN}$ may be expressed in LVPECL format.

Timed output signals on output lines $A_{IN}$, $B_{IN}$ faithfully recreating timing present in differential signals $A_{IN}$, $B_{IN}$ and are substantially true representations of differential signals $A_{IN}$, $B_{IN}$ in so far as timing aspects of variations of those signals are concerned. The amplitudes of the variations of timed output signals on output lines 550, 552, 554, 556 are not necessarily compliant with whatever format is employed in the system (e.g., LVDS or LVPECL; not shown in FIG. 5) in which repeater apparatus 500 is employed. Instead, timed output signals on output lines 550, 552, 554, 556 are provided to a level setting circuit 562 configured for acceptance and treatment by level setting circuit 562.

Time-switch circuit 542 includes MOS (Metal Oxide Semiconductor) transistors M1, M2 coupled in parallel. Transistor M1 has a gate 602, a source 604 and a drain 606. Transistor M2 has a gate 608, a voltage source 610 and a drain 612. Sources 604, 610 are coupled in common with a voltage source 601. Drains 606, 612 are coupled with output lines 550, 552 and thence with a level setting circuit 562. A current mirror array 620 including MOS transistors M3, M4 is coupled between voltage source 601 and sources 604, 610 of transistors M1, M2 to ensure consistent current flow from voltage source 601 through transistors M1, M2 to level setting circuit 562 via output lines 550, 552 when transistors M1, M2 are gated.

Input lines 510, 512 deliver differential input signal $A_{IN}$ to gate 602 from input locus 502. Input lines 520, 522 deliver differential input signal $B_{IN}$ to gate 608 from input locus 504. Transistors M1, M2 are selected to exhibit operating parameters consistent with the LVDS standard so that differential input signals $A_{IN}$, $B_{IN}$ operate as gating signals for transistors M1, M2 to control current flow through transistors M1, M2 with no intervening attenuation or other circuitry between input loci 502, 504 and gates 602, 608 of transistors M1, M2. Thus there is no alteration or introduction of additional capacitance or other source of time delay or alteration of differential input signals $A_{IN}$, $B_{IN}$ in driving transistors M1, M2. Accordingly, output signals appearing at output lines 550, 552 substantially faithfully represent the timing aspects of differential input signals $A_{IN}$, $B_{IN}$ in LVDS format as they are presented to level setting circuit 562.

Time-switch circuit 544 includes circuit portions 544a, 544b coupled in parallel. Circuit portion 544a includes MOS transistor U1 and an NPN Bipolar Junction transistor Q1. Transistor U1 has a gate 630, a source 632 and a drain 634. Transistor Q1 has a base 636, a collector 638 and an emitter 639. Source 634 of transistor U1 is coupled with voltage source 601; drain 634 of transistor U1 is coupled with base 636 of transistor Q1. Collector 638 is coupled with output line 554 and thence with a level setting circuit 562. Circuit portion 544b includes MOS transistor U2 and an NPN Bipolar Junction transistor Q2. Transistor U2 has a gate 640, a source 642 and a drain 644. Transistor Q2 has a base 646, a collector 648 and an emitter 649. Source 644 of transistor U2 is coupled with voltage source 601; drain 644 of transistor U2 is coupled with base 646 of transistor Q2. Collector 648 is coupled with output line 556 and thence with a level setting circuit 562. In this configuration, MOS transistors U1, U2 are employed as signal following current sources. Emitters 639, 649 are coupled in common.

A current mirror array 650 including MOS transistors U3, U4, U5, U6, U7, U8, U9 is coupled with a current bias input locus 652. Current in transistor U8 is mirrored in other transistors U3, U4, U5, U6, U7, U9. Transistor U9 is coupled with transistor M4 of current mirror array 620 so that changes in current appearing at current bias 652 may be reflected in current mirror array 620. Transistor U4 assures consistent current flow through transistor U1 when transistor U1 is conductive. Transistor U3 assures consistent current flow through transistors Q1, Q2 when either of transistor Q1, Q2 is conductive. Transistor U5 assures consistent current flow through transistor U2 when transistor U2 is conductive. Transistors U6, U7 assure consistent current flow through level setting circuit 562.

Input lines 510, 514 deliver differential input signal $A_{IN}$ to gate 630 of transistor U1 from input locus 502. Input lines 520, 524 deliver differential input signal $B_{IN}$ to gate 640 of transistor U2 from input locus 504. Transistors U1, U2 are gatingly controlled by differential input signals $A_{IN}$, $B_{IN}$ and, when gated to be conductive, transistors U1, U2 deliver a gating signal to gate 636 of transistor Q1 or gate 646 of transistor Q2 as appropriate. The gating signals delivered to gates 636, 646 are at a voltage reduced from the voltage levels appearing at gates 630, 640 of transistors U1, U2. No significant delay or other aberration is introduced to the signal following by circuit portions 544a, 544b of differential input signals $A_{IN}$, $B_{IN}$ by circuit portions 544a, 544b. Transistors U1, U2 are employed as signal following voltage reducer components in this preferred embodiment of the apparatus of the present invention. Circuit portions 544a, 544b are selected to exhibit operating parameters consistent with the LVPECL standard so that differential input signals $A_{IN}$, $B_{IN}$ operate as gating signals for transistors U1, U2 to control gating of transistors Q1, Q2, thereby controlling current flow through transistors Q1, Q2 with no intervening attenuation or other circuitry between input loci 502, 504 and gates 630, 640 of transistors U1, U2. Thus there is no alteration or introduction of additional capacitance or other source of time delay or alteration of differential input signals $A_{IN}$, $B_{IN}$ in driving circuit portions 544a, 544b. Accordingly, output signals appearing at output lines 554, 556 substantially faithfully represent the timing aspects of differential input signals $A_{IN}$, $B_{IN}$ in LVPECL format as they are presented to level setting circuit 562.

Level setting circuit 562 receives timed output signals from output lines 550, 552, 554, 556 as appropriate and treats those timed output signals to present output signals $A_{OUT}$, $B_{OUT}$ at output loci 568, 569 appropriately configured to conform to the format employed in the system or network (e.g., LVDS or LVPECL; not shown in FIG. 5) in which repeater apparatus 500 is employed. Level setting circuit 562 includes NPN Bipolar Junction transistors Q3, Q4 coupled in parallel between voltage source 601 and ground via current mirror array 650. Transistor Q3 has a base 660, a collector 662 and an emitter 664. Transistor Q4 has a base 670, a collector 672 and an emitter 674. A voltage bias BIAS 2 is provided to bases 660, 670. Emitter 664 is coupled with transistor U6 of current mirror array 650. Emitter 674 is coupled with transistor U7 of current mirror array 650. An impedance R1 is coupled in series between voltage source 601 and collector 662 of transistor Q3. An impedance R1 is coupled in series between voltage source 601 and collector 672 of transistor Q4. Impedances R1, R2 are selected to set levels for signals presented at output loci 568, 569 to conform with the signaling standard or format used in the system (e.g., LVDS or LPECL; not shown in FIG. 5) with which repeater apparatus 500 is employed.

In such manner output signals $A_{OUT}$, $B_{OUT}$ presented at output loci 568, 569 are properly timed and properly otherwise formatted in terms of amplitudes and other signal characteristics to faithfully represent input differential signals $A_{IN}$, $B_{IN}$, regardless of whether input signals $A_{IN}$, $B_{IN}$ are transmitted in LVDS format or in LVPECL format. Level setting circuit 562 may be constructed to present output signals $A_{OUT}$, $B_{OUT}$ configured to conform with LVDS format or LVPECL format. That is, in operation, differential signals $A_{IN}$, $B_{IN}$ will likely be conveyed in either LVDS format or LVPECL format. It is not likely that the signals $A_{IN}$, $B_{IN}$ will be conveyed in both formats simultaneously. Repeater apparatus 500 is configured to accept signals in either LVPECL format or LVDS format as a way to make one part do "double duty" to reduce part count and inventory requirements.

In an exemplary practical implementation of the present invention, a user seeking to place a repeater in a data communication network may select a model of repeater apparatus 500 for which one of time-switch units 542, 544 can handle the format of signals then extant in the user's network. For example, a user may have a network that operates using signals formatted for LVDS standards. In such a situation, the user will ensure that level setting circuit 562 sets appropriate levels for output signals to be compatible with downstream units (other repeaters, receivers, or other equipment) that are configured for dealing with signals conveyed according to the LVDS standard. If the user should later wish to change the network to operate using signals configured according to another the LVPECL standard, then the user needs only to change level setting circuit 562 to another such unit constructed to present LVPECL configured signals at output loci 568, 569. Input may still be made to the same timing circuit 540 with no changes because of the capability of timing circuit 540 to handle both signal formats.

Thus, to summarize, the preferred embodiment of repeater apparatus 500 is designed using two parallel differential pairs of transistors in time-switch circuits 542, 544. Time-switch circuits 542, 544 operate over different common mode ranges for a total common mode range that extends rail to rail for the operating standards that may be employed for input signals arriving at input loci 502, 504. Lower common mode voltages may be handled by a PMOS (P-channel Metal Oxide Semiconductor) pair of transistors M1, M2 for propagating the signal through repeater apparatus 500. Higher common mode ranges may be handled by BJT (Bipolar Junction Transistor) pair of transistors Q1, Q2 for propagating the signal through repeater apparatus 500. DC level shifting of signals provided to BJT transistor pair Q1, Q2 is effected using transistors U1, U2 as voltage dropping signal followers allows the circuitry of repeater apparatus 500 to operate above the positive rail of operating standards that may be employed for signals arriving at input loci 502, 504. Transistors U1, U2 are selected to operate so that minimum transconductance is needed in order that repeater apparatus may carry out high speed switching across the entire commmon mode range of both time-switch circuits 542, 544. Device types and sizes are preferably selected to meet high speed operating requirements as well as other requirements. A BiCMOS (Bipolar Complementary Metal Oxide Silicon) fully differentiated architecture is preferably employed to provide balanced gain, propagation delay, and rise and fall times for excellent switching performance across the entire combined common mode range.

Differential pair M1, M2 is sensitive to the lower portion of the common mode range of repeater apparatus 500, such as the LVDS range, and differential pair Q1, Q2 operates over the higher portion of the common mode range of repeater apparatus 500. In the lower portion of the common mode range, to operate transistors M1, M2 without going into the linear region, one must satisfy the relationship (referring to FIG. 5):

$$V_{DSM1} \leq V_{GSSM1} - V_{TM1} \quad [1]$$

Where $V_{DSM1}$ is voltage between drain and source of M1;
$V_{GSSM1}$ is voltage between gate and source at saturation of M1;
$V_{TM1}$ is threshhold voltage of M1; and $$V_{DSM1} = V_{DSSU6} - (V_{ic} - V_{GSM1}) \quad [2]$$

Where $V_{DSSU6}$ is voltage between drain and source at saturation of U6;
$V_{ic}$ is common mode voltage; and
$V_{GSM1}$ is voltage between gate and source of M1.

Combining expression [1] with expression [2] yields:

$$V_{ic} \geq V_{DSSU6} + V_{TM1} \quad [3]$$

The transistor pair M1, M2 will operate until:

$$V_{ic} = V_{CC} + V_{DSSM3} + V_{GSSM1} \quad [4]$$

Where $V_{CC}$ is a supply voltage applied at voltage source 601; and
$V_{DSSM3}$ is voltage between drain and source at saturation of M3.

Hence, the range of operation for M1, M2 is:

$$V_{DSSU6} + V_{TM1} \leq V_{ic} \leq V_{CC} + V_{DSSM3} + V_{GSSM1} \quad [5]$$

Recal that $V_{TM1}<0$, $V_{DSSM3}<0$, $V_{GSSM1}<0$. Under such conditions, the differential pair Q1, Q2 will be on when:

$$V_{ic} \geq V_{GSSM1} + V_{be\ on\ Q1} + V_{DSSU3} \quad [6]$$

Where $V_{be\ on\ Q1}$ is base–emitter voltage for turning on Q1; and
$V_{DSSU3}$ is voltage between drain and source at saturation of U3.

To achieve proper switching one must prevent U1, U2 from going into the linear region, hence:

$$V_{DSU1} \geq V_{GSSU1} - V_{TU1} \quad [7]$$

Where $V_{DSU1}$ is voltage between drain and source of U1;
VGSSU1 is voltage between gate and source at saturation of U1; and
VTU1 is threshhold voltage of U1.

From inspection of FIG. 5:

$$V_{DSU1} = V_{CC} - (V_{ic} - V_{GSSU1}) \quad [8]$$

Combining expressions [6], [7] and [8]:

$$V_{ic} \leq V_{CC} = V_{TU1} \quad [9]$$

In order to meet requirements for high speed communication, one must also prevent transistors Q1, Q2 from going into saturation. To prevent transistors Q1, Q2 from going into saturation, one must prevent the base-to-collector junction of each of transistor Q1, Q2 from forward biasing. Therefore:

$$V_{bcQ1} \leq V_{bc\ on\ Q1} \quad [10]$$

Where $V_{bcQ1}$ is base to collector voltage of Q1; and
$V_{bc\ on\ Q1}$ is base–collector voltage on the verge of turning on Q1.

Which means:

$$V_{ic} \leq V_{CC} + V_{GSSU1} + V_{bc\ on\ Q2} - I_{R2} * R2 \quad [11]$$

Where $V_{bc\ on\ Q2}$ is base–collector voltage on the verge of turning on Q2;
$I_{R2}$ is current through resistor R2; and
R2 is resistance of resistor R2.

Expressions [9] and [11] can be used to determine the maximum value of $V_{ic}$ that the input stage of repeater apparatus 500 can handle. That value will be the smallest value given by one of expressions [9] and [11]. Examining expression [11], one can observe that repeater apparatus 500 must be designed in such a way that:

$$I_{R2}*R2=V_{bc\ on\ Q1} \quad [12]$$

Substituting expression [12] in expression [10] gives:

$$V_{ic} \leq V_{CC}+V_{GSSU1} \quad [13]$$

One can thus observe that the smallest value of $V_{ic}$ will be given by expression [9], and by means of expression [9] the maximum value of $V_{ic}$ may also be determined. Putting all results together, one may observe that for the transistor pair Q1, Q2:

$$V_{GSSU1}+V_{be\ on\ Q1}+V_{DSSU3} \leq V_{ic} \leq V_{CC}+V_{TU1} \quad [14]$$

Recalling the conclusion reached in expression [5], the the range of operation for M1, M2 is:

$$V_{DSSU6}+V_{TM1} \leq V_{ic} \leq V_{CC}+V_{DSSM3}+V_{GSSM1} \quad [5]$$

To ensure that the entire common mode range is covered without a dead zone, one must satisfy:

$$V_{CC}+V_{DSSM3}+V_{GSSM1} > V_{GSSU1}+V_{be\ on\ Q1}+V_{DSSU3} \quad [15]$$

Once the relationship of expression [15] is taken into account, the input common mode range for the entire structure of repeater apparatus 500 can be described:

$$V_{DSSU6}+V_{TM1} \leq V_{ic} \leq V_{CC}+V_{TU1} \quad [16]$$

In implementing the preferred embodiment analog implementation of repeater apparatus 500 illustrated in FIG. 5, the back gates of MOS devices (i.e., transistors M1, M2, M3, M4) are connected either to the highest voltage or the lowest voltage, depending upon the channel type of MOS device employed. Such a connection arrangement increases the absolute value of threshhold voltage as compared with the case where the source and backgate are tied together. The connections contemplated by the present invention work to extend the common mode input range, as is demonstrated by expressions [1] through [16].

Figure 6:
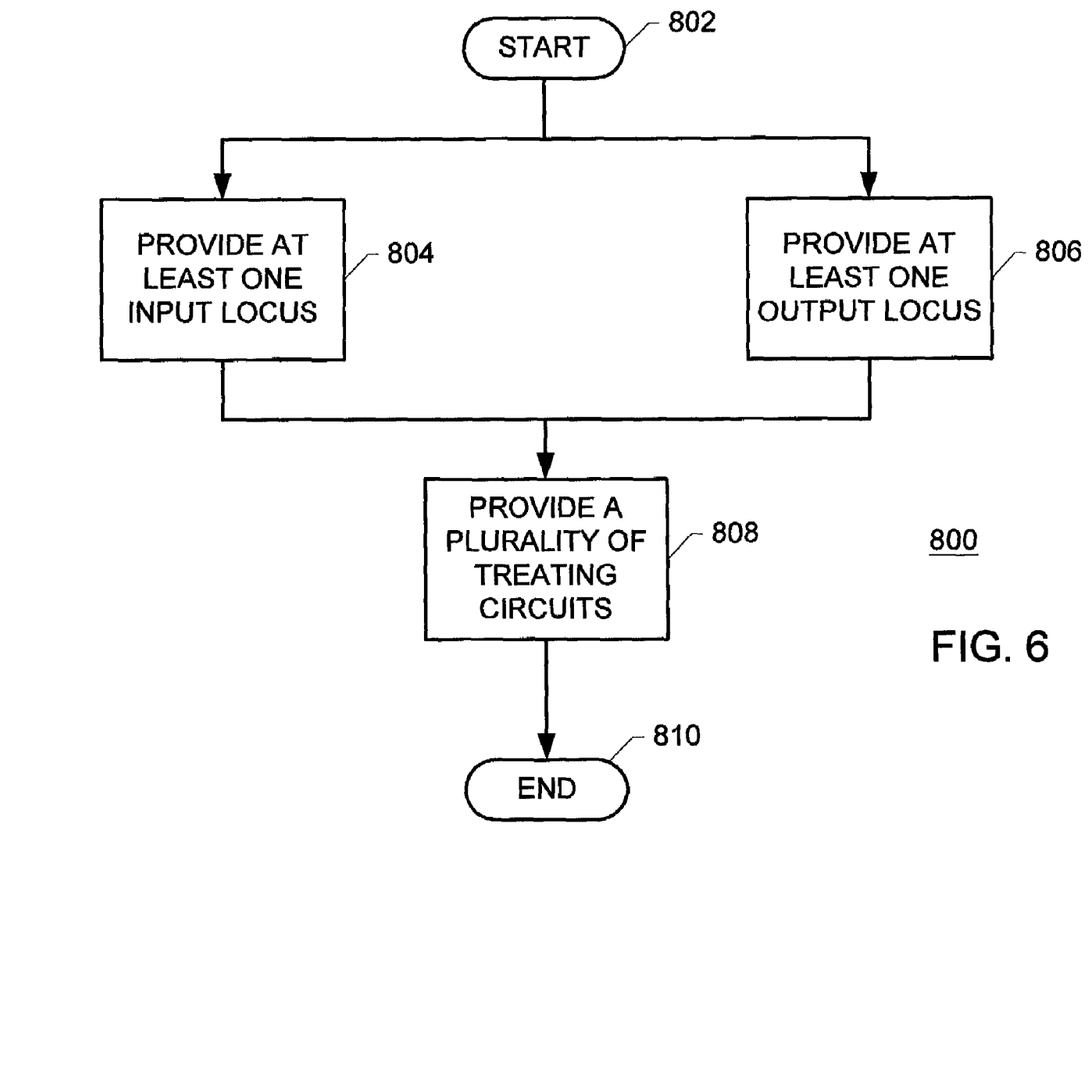
FIG. 6 is a flow diagram illustrating the preferred embodiment of the method of the present invention.

FIG. 6 is a flow diagram illustrating the preferred embodiment of the method of the present invention. In FIG. 6, a method 800 for manufacturing an apparatus for handling a plurality of high speed data communication signals is illustrated. The plurality of communication signals is delivered to the apparatus in at least one input channel expressed as an encoded signal embodied in signal excursions in at least one predetermined format operating within at least one excursion range. Method 800 begins at a Start locus 802 and proceeds, in no particular order, with providing at least one input locus as indicated by a block 804, and providing at least one output locus as indicated by a block 806. The at least one input locus is configured for coupling with the at least one input channel for receiving the plurality of communication signals. The at least one output locus is configured for coupling with at least one output channel for presenting the plurality of communication signals for further treatment in a desired format.

Method 800 continues with providing a plurality of treating circuits for treating the signal excursions in a plurality of formats as indicated by a block 808. The plurality of formats includes the predetermined format and the desired format. Each respective treating circuit of the plurality of treating circuits is coupled with at least one respective input locus and coupled with at least one respective output locus. The apparatus is constructed to present sufficiently low capacitance between the at least one input locus and the at least one output locus to impart substantially zero time delay to the communication signals. Method 800 terminates as indicated by an End locus 810.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. An apparatus for handling a plurality of high speed data communication signals; said plurality of communication signals being delivered to the apparatus in at least one input channel; each respective communication signal of said plurality of communication signals being expressed as a respective encoded signal embodied in signal excursions in at least one predetermined format operating within at least one excursion range; the apparatus comprising:
   (a) at least one input locus coupled with said at least one input channel for receiving said plurality of communication signals;
   (b) at least one output locus configured for presenting selected communication signals of said plurality of communication signals for further treatment in a desired format in at least one output channel; and
   (c) a plurality of treating circuits for treating said signal excursions in a plurality of formats; said plurality of formats including said at least one predetermined format and said desired format; each respective treating circuit of said plurality of treating circuits being coupled with at least one said respective input locus and coupled with at least one said respective output locus; wherein
   the apparatus presenting sufficiently low capacitance between said at least one input locus and said at least one output locus to impart substantially zero time delay to said plurality of communication signals.

2. An apparatus for handling a plurality of high speed data communication signals as recited in claim 1 wherein said plurality of formats is two formats and wherein said plurality of treating circuits is two treating circuits; a first treating circuit of said plurality of treating circuits treating said signal excursions in a first said format; a second treating circuit of said plurality of treating circuits treating said signal excursions in a second said format, and wherein each respective treating circuit of said first treating circuit and said second treating circuit comprises a transistor-switching circuit; each said transistor-switching circuit comprising a pair of transistors coupled in parallel; each transistor of said pair of transistors being gated by a respective communication signal of said plurality of communication signals.

3. An apparatus for handling a plurality of high speed data communication signals as recited in claim 1 wherein said plurality of formats is two formats and wherein said plurality of treating circuits is two treating circuits; a first treating circuit of said plurality of treating circuits treating said signal excursions in a first said format; a second treating circuit of said plurality of treating circuits treating said signal excursions in a second said format.

4. An apparatus for handling a plurality of high speed data communication signals as recited in claim 3 wherein said signal excursions in said first format vary between a first minimum value and a first maximum value, and wherein said signal excursions in said second format vary between a second minimum value and a second maximum value.

5. An apparatus for handling a plurality of high speed data communication signals as recited in claim 4 wherein said first maximum value is higher than said second minimum value and lower than said second maximum value.

6. An apparatus for handling a plurality of high speed data communication signals as recited in claim 3 wherein each respective treating circuit of said plurality of treating circuits comprises a transistor-switching circuit; each said transistor-switching circuit comprising a pair of transistors coupled in parallel; each transistor of said pair of transistors being gated by a respective communication signal of said plurality of communication signals.

7. An apparatus for handling high speed data communication signals as recited in claim 6 wherein said signal excursions in said first format vary between a first minimum value and a first maximum value, wherein said signal excursions in said second format vary between a second minimum value and a second maximum value, wherein operating parameters of a first treating circuit of said plurality of treating circuits accommodate said signal excursions in said first format, and wherein operating parameters of a second treating circuit of said plurality of treating circuits accommodate said signal excursions in said second format.

8. An apparatus for handling a plurality of high speed data communication signals as recited in claim 7 wherein said first maximum value is higher than said second minimum value and lower than said second maximum value.

9. An apparatus for handling a plurality of high speed data communication signals as recited in claim 7 wherein said first format is Low Voltage Differential Signaling (LVDS) and said second format is Low Voltage Positive Emitter Coupled Logic (LVPECL).

10. An apparatus for effecting input for a repeater for use in conveying a plurality of high speed data communication signals; said plurality of communication signals being delivered to the apparatus in differential signaling at a pair of channels; said differential signaling being embodied in a first encoded signal delivered at a first channel of said pair of channels and a second encoded signal delivered at a second channel of said pair of channels; said first encoded signal and said second encoded signal being embodied in signal excursions in at least one predetermined format operating within at least one excursion range; the apparatus comprising:
  (a) a first input locus coupled with said first channel for receiving said first encoded signals;
  (b) a second input locus coupled with said second channel for receiving said second encoded signals;
  (c) at least one output locus configured for presenting said plurality of communication signals for further treatment in a desired format in at least one output channel; each respective output locus of said at least one output locus being provided for presenting an output signal to at least one output channel of said at least one output channel; and
  (d) a plurality of treating circuits for treating said first signal excursions and said second signal excursions in a plurality of formats; said plurality of formats including said at least one predetermined format and said desired format; each respective treating circuit of said plurality of treating circuits being coupled with at least one of said first input locus and said second input locus; each respective treating circuit of said plurality of treating circuits being coupled with at least one output locus of said at least one output locus; wherein
  the apparatus presenting sufficiently low capacitance between said first input locus and said at least one output locus and presenting sufficiently low capacitance between said second input locus and said at least one output locus to impart substantially zero time delay to said plurality of communication signals.

11. An apparatus for effecting input for a repeater for use in conveying a plurality of high speed data communication signals as recited in claim 10 wherein said plurality of treating circuits is two treating circuits; a first treating circuit of said plurality of treating circuits treating signals in a first format of said two formats; a second treating circuit of said plurality of treating circuits treating signals in a second format of said two formats, and wherein each respective treating circuit of said first treating circuit and said second treating circuit comprises a transistor-switching circuit; each said transistor-switching circuit comprising a pair of transistors coupled in parallel; a first transistor of said pair of transistors being gated by said first encoded signals; a second transistor of said pair of transistors being gated by said second encoded signals.

12. An apparatus for effecting input for a repeater for use in conveying a plurality of high speed data communication signals as recited in claim 10 wherein said plurality of treating circuits is two treating circuits; a first treating circuit of said plurality of treating circuits treating signals in a first format of said two formats; a second treating circuit of said plurality of treating circuits treating signals in a second format of said two formats.

13. An apparatus for effecting input for a repeater for use in conveying a plurality of high speed data communication signals as recited in claim 12 wherein said signal excursions in said first format vary between a first minimum value and a first maximum value, and wherein said signal excursions in said second format vary between a second minimum value and a second maximum value.

14. An apparatus for effecting input for a repeater for use in conveying a plurality of high speed data communication signals as recited in claim 13 wherein said first maximum value is higher than said second minimum value and lower than said second maximum value.

15. An apparatus for effecting input for a repeater for use in conveying a plurality of high speed data communication signals as recited in claim 12 wherein each respective treating circuit of said plurality of treating circuits comprises a transistor-switching circuit; each said transistor-switching circuit being actuated by at least one of said first encoded signals and said second encoded signals; each said transistor-switching circuit comprising a pair of transistors coupled in parallel; a first transistor of said pair of transistors being gated by said first encoded signals; a second transistor of said pair of transistors being gated by said second encoded signals.

16. An apparatus for effecting input for a repeater for use in conveying a plurality of high speed data communication signals as recited in claim 15 wherein said signal excursions in said first format vary between a first minimum value and a first maximum value, and wherein said signal excursions in said second format vary between a second minimum value and a second maximum value.

17. An apparatus for effecting input for a repeater for use in conveying a plurality of high speed data communication signals as recited in claim 16 wherein said first maximum value is higher than said second minimum value and lower than said second maximum value.

18. An apparatus for effecting input for a repeater for use in conveying a plurality of high speed data communication signals as recited in claim 16 wherein said first format is Low Voltage Differential Signaling (LVDS) and said second format is Low Voltage Positive Emitter Coupled Logic (LVPECL).

19. A method for manufacturing an apparatus for handling a plurality of high speed data communication signals; said plurality of communication signals being delivered to the apparatus in at least one input channel expressed as an encoded signal embodied in signal excursions in at least one predetermined format operating within at least one excursion range; the method comprising the steps of:

(a) in no particular order
  (1) providing at least one input locus configured for coupling with said at least one input channel for receiving said plurality of communication signals; and
  (2) providing at least one output locus configured for coupling with at least one output channel for presenting said plurality of communication signals for further treatment in a desired format;

(b) providing a plurality of treating circuits for treating said signal excursions in a plurality of formats; said plurality of formats including said predetermined format and said desired format; each respective treating circuit of said plurality of treating circuits being coupled with at least one said respective input locus and coupled with at least one said respective output locus; and (c) constructing the apparatus to present sufficiently low capacitance between said at least one input locus and said at least one output locus to impart substantially zero time delay to said communication signals.

20. A method for manufacturing an apparatus for handling a plurality of high speed data communication signals as recited in claim 19 wherein said plurality of formats is two formats and wherein said plurality of treating circuits is two treating circuits; a first treating circuit of said plurality of treating circuits treating signals in a first said format; a second treating circuit of said plurality of treating circuits treating signals in a second said format; each respective treating circuit of said plurality of treating circuits comprises a transistor-switching circuit; each said transistor-switching circuit comprising a pair of transistors coupled in parallel; each transistor of said pair of transistors being gated by a respective communication signal of said plurality of communication signals.

* * * * *